Dec. 12, 1967

P. J. NATHO 3,358,207

CONTROL MECHANISM TO POSITION A MEMBER

Filed Oct. 30, 1964

INVENTOR.
PAUL J. NATHO
BY
*James F. Jackson*
AGENT

Dec. 12, 1967  P. J. NATHO  3,358,207
CONTROL MECHANISM TO POSITION A MEMBER
Filed Oct. 30, 1964  3 Sheets-Sheet 3
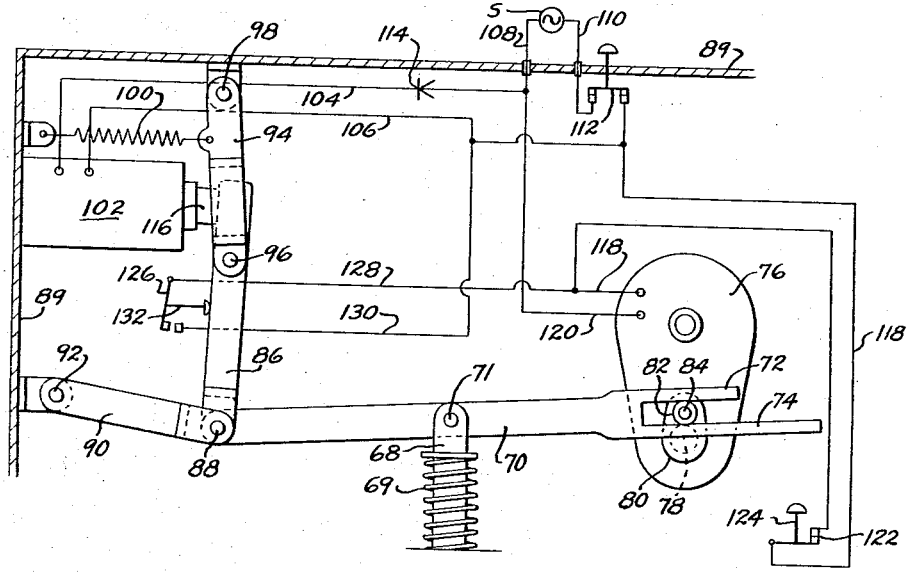
FIG. 4.
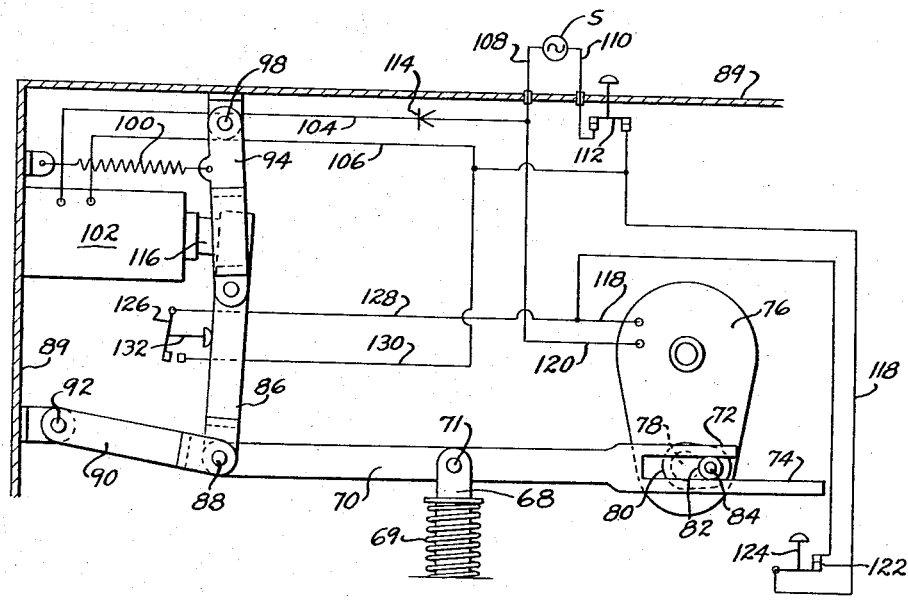
FIG. 5.
INVENTOR.
PAUL J. NATHO
BY
AGENT United States Patent Office 3,358,207
Patented Dec. 12, 1967

3,358,207
CONTROL MECHANISM TO POSITION A MEMBER
Paul J. Natho, Houston, Tex., assignor to ACF Industries, Incorporated, New York, N.Y., a corporation of New Jersey
Filed Oct. 30, 1964, Ser. No. 407,651
11 Claims. (Cl. 318—466)

This invention is directed generally to petroleum production facilities such as the flow control apparatus associated with oil wells and to offshore loading facilities, and more specifically to the remote control of hydraulic actuated valve operating mechanisms and of electrically energized valve operating mechanisms.

The petroleum industry in its continuous exploration and research programs has recently discovered and developed a number of offshore petroleum and natural gas reserves of major importance and it is expected that such exploration activity will be greatly increased. Oil wells which are drilled in these offshore reserves are provided with a flow control apparatus or wellhead assembly, generally referred to as a "Christams Tree," which includes a number of valves for selectively controlling the flow of oil or gas from the well. The flow control apparatus, depending upon the type of completion technique, may either be positioned on a platform above the surface of the ocean or may be positioned on the ocean floor under considerable depth of water. Valves for flow control devices, which are positioned beneath the surface of the ocean, are generally controlled by hydraulic fluid actuated piston operator apparatus. Piston operators connected to the valve stem of the valves are controlled by pressurized fluid flowing through hydraulic lines, which connect the piston operator to a control station, remote from the valve to be operated.

Hydraulic valves are frequently provided with solenoid actuation mechanisms for the operation thereof so that they can be controlled electrically from a remote location. For example, several hydraulic valves may be controlled from a console or panel board for the operation of a flow control system. It has been found, however, that the high inrush of current requirements of solenoid energized valves tend to limit the distance that the valve can be placed from its source of electrical energy because of the type of electrical line and the nature of the electrical control system. The control distance involved in controlling offshore oil wells and loading facilities frequently would amount to several miles, thereby rendering solenoid control of the system impractical because of the costs involved.

Accordingly, it is a primary object of this invention to provide a novel control mechanism which is electrically energized and which is adaptable for the control of either electrical, mechanical, or hydraulically powered operating mechanisms.

It is a further object of this invention to provide a novel control mechanism for operating mechanisms which may be submerged, or remotely located as desired.

An even further object of this invention contemplates the provision of a novel control mechanism for power operating mechanisms, which is adapted to cause instantaneous movement of the operating mechanism to a safe position in case of power failure in the control mechanism.

It is an even further object of this invention to provide a novel control mechanism for power operating mechanisms which is inexpensive in manufacture and reliable in use.

Other and further objects of this invention will be obvious upon an understanding of the illustrated embodiments about to be described or will be indicated in the appended claims; and various advantages not referred to herein will occur to one skilled in the art upon employment of the invention in practice.

Preferred embodiments of the invention have been chosen for the purpose of illustration and description and are shown in the accompanying drawings forming a part of the specification wherein;

FIGURES 2, 3, 4 and 5 are elevational views of the control mechanism of FIGURE 1 illustrating operation of the control system.

Briefly, the invention comprises an electrically energized electro-mechanical control structure incorporating an electrical energizing circuit which is adapted to impart longitudinal movement to the operating stem of a control device to a predetermined operative position, for example a control valve, a control switch, etc., and to maintain the operating stem in the predetermined operative position until the electrical circuit is opened. When the electrical circuit is opened either selectively or by damage to the circuitry or upon electrical power failure, the control device will be automatically and instantly moved to a predetermined safe position. The control structure, upon re-closing of the electrical circuit, will move the stem of the control device to the predetermined position and again will maintain the stem in this position until the electrical circuit is again opened. The control structure is so arranged that at any time during its movement to the predetermined position, it can be deactivated and returned to its inoperative or safe position merely by opening the electrical circuit. This provides a safety feature because upon failure of the electrical circuitry, either from damage or power failure, the control structure will immediately return to its inoperative position.

For example, the control structure might be employed to actuate a control device for a power operator on a remotely located valve. The power operator for which the control device is employed may be either a hydraulically powered operator or an electrically energized power operator. For use with a hydraulically controlled operator the invention involves an electrically energized mechanical structure for movement of a hydraulic control valve between open and closed positions which in turn facilitates movement of the power operator between closed and open position by controlling hydraulic fluid flow. When employing the invention with an electrically energized power operator, the control system of this invention includes the same mechanical linkage electrically driven for movement of an electrical control switch between open and closed positions to control the motor of the power operator. The valve, with which the control system of this invention is associated, will be automatically moved to a preselected safe (either closed or open) position upon failure of the electrical circuitry of the control system.

Figure 1:
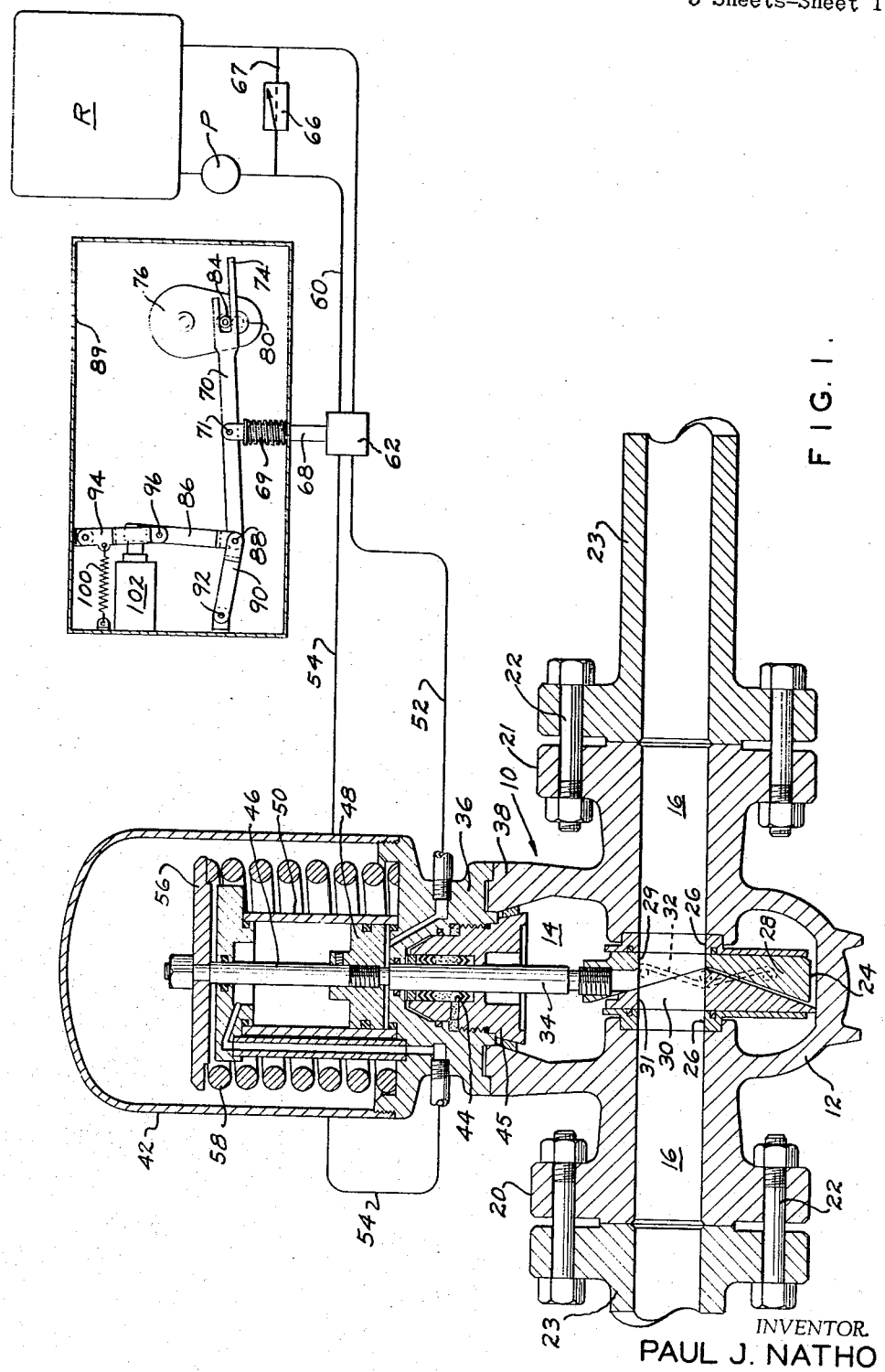
FIGURE 1 is an elevational view partially in section and partially schematically, illustrating a gate valve having a hydraulically powered operator and an elevational view of the control mechanism in accordance with this invention.

Referring now to the drawings for a better understanding of the invention, a valve 10 is illustrated in FIGURE 1, which comprises a valve body 12 formed with a valve chamber 14, and having flow passages 16 in communication with the valve chamber. Flanges 20 and 21 are formed integral with the valve body and receive bolts 22 for bolting the valve into flanged pipeline 23. The valve 10 may be connected to a pipe system by any other other well-known connection structure, such as welded or threaded connection for example, without departing from the spirit or scope of this invention.

An expanding gate structure 24 of the parallel expanding double-wedge type is positioned within the valve chamber 14 between a pair of oppositely disposed seat members 26. The valve member 24 consists of a gate 28 and a segment 30, which are biased together by a spring 32. The gate and segment are each formed with transverse bores 29 and 31 respectively which when in assembly define a through passage which is alignable with the flow passages 16 to allow the flow of fluid through the valve. The gate and segment structures are movable relative one to the other to expand the valve member into tight sealing engagement with the seat members 26. The valve member 24 is movable between open and closed positions relative to the flow passages 16 by a valve stem 34.

A bonnet member 36 and an annular flange portion 38 of the valve body 12 cooperate to define a closure for the valve. As illustrated in FIGURE 1, the bonnet also forms the base portion of a power operator 42. The valve stem 34 extends through a packing assembly 44 formed by the cooperation of a packing assembly retainer 45 and the bonnet 36, and is connected to the operating stem 46 of the power operator 42. The operating stem 46 is driven by a piston 48 positioned in a cylinder 50 and which is energized by pressurized fluid which enters the upper portion of the cylinder 50 through a conduit 54, or the lower portion of the cylinder 50 through a conduit 52. A plate 56, which is fixed to the upper portion of the operating stem 46, maintains a compression spring 58 under compression between the plate and the base portion of the piston operator 42. For movement of the piston 48 downwardly to drive the valve stem and valve to its open position, hydraulic fluid is forced through the conduit 54 to the upper portion of the cylinder under pressure supplied by a pump P and under control of a rising stem control valve 62. The valve 62 might be one of various commercially available two-way push-button type control valves without departing from the spirit or scope of this invention. A compression spring 69, which may either be an internal or external spring, is disposed about the stem 68 of the control valve, applies a bias at all times on an actuating arm 70 tending to move the arm 70 in a direction away from the valve 62. As the piston 48 moves downwardly under the influence of the pressurized fluid thereabove, the fluid immediately below the piston 48 will flow out of the cylinder, through the conduit 52 and to a reservoir R. Depending upon the type of control valve employed, the conduits 52 and 54 may be in communication with the control valve 62, as illustrated in FIGURE 1.

A check valve 66 is positioned in a line 67 which interconnects the lines 52 and 54 downstream from the pump P and allows the flow of fluid from the line 54 to the line 52 and back to the reservoir should pressure within the line 54 become greater than a preselected pressure range. The line 60 is maintained under pressure at all times by the pump P and transmission of the pressurized fluid to the lines 52 or 54 is selectively controlled by the control valve 62.

In accordance with this invention, a selectively energized control system is provided for actuation of the valve stem 68 of the valve 62, as illustrated in greater detail in FIGURES 2-5. The control system comprises a stem actuating arm 70 which is pivotally connected intermediate its ends to the upper portion of the stem 68 of the control valve 62. The stem actuating arm 70 is bifurcated at one end, thereby forming a pair of generally parallel cam tracks 72 and 74. A small rotary motor 76 is positioned adjacent the stem actuating arm 70 and is adapted through a gear reduction arrangement to drive a shaft 78 thereof in a clockwise direction as viewed in FIGURES 2-5. A roller arm 80 is fixed to one end of the shaft 78 and is adapted to be driven by the shaft in a circular clockwise path about the shaft 78. A roller 82 is rotatably mounted on a crank arm 84, which is fixed to the roller arm 80, and is disposed between the cam tracks 72 and 74. The roller 82 cooperates with the cam tracks 72 and 74 to transmit the rotary movement of the roller arm to the stem actuating arm in the form of an oscillating motion.

A toggle arm 86 is connected at one end thereof to the other end of the stem actuating arm by a pivot 88. A first connecting link 90 is pivotally connected at one end thereof to the pivot 88 and at the other end thereof to a wall of a housing 89 for the control system by a pivot 92. A second connecting link 94 is connected by a pivot 96 to the toggle arm 86, intermediate the ends of the toggle arm, and is pivotally connected at its other end to a wall of the actuator housing by a pivot 98. A spring 100 is connected between the wall structure of the actuator housing and the second connecting link at a point adjacent the pivot 98 and serves to bias the second connecting link and the toggle arm toward the control valve 62. A direct current electromagnet 102 is fixed to the wall structure of the housing 89 at a position adjacent the free end of the toggle arm 86 and is adapted when energized to maintain the toggle arm in the position illustrated in FIGURE 2. The electromagnet 102 is of sufficient strength to prevent the spring 69 of the control valve 62 from forcing the toggle arm 86 outwardly.

Figure 2:
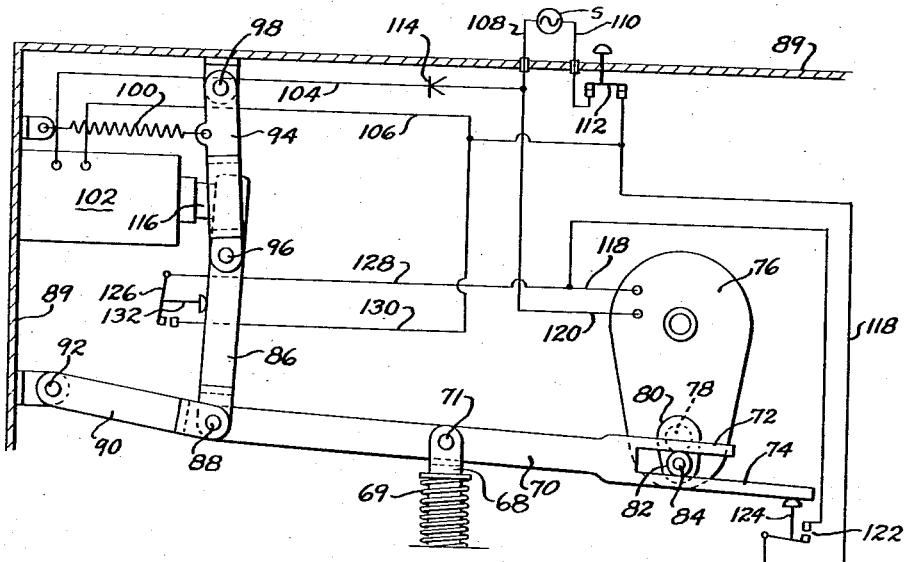
Figure 3:
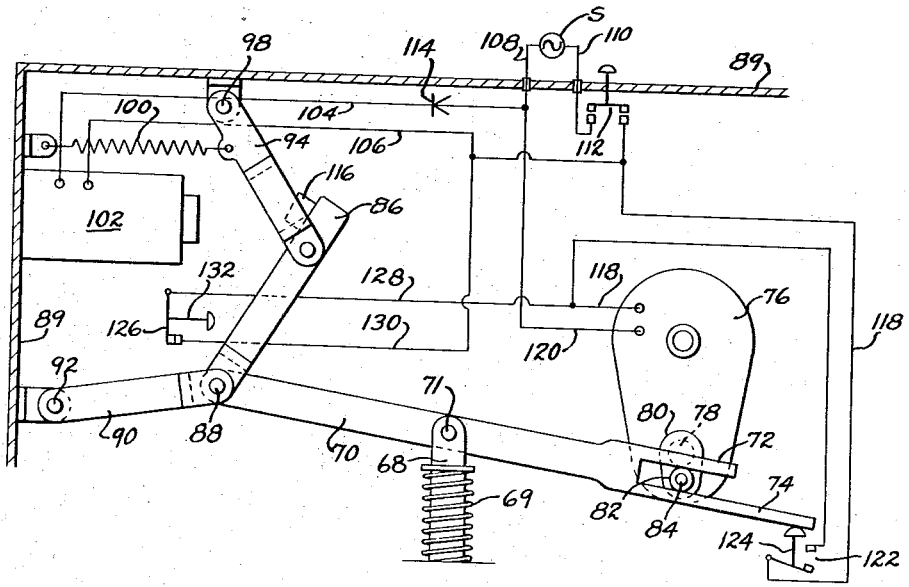

As illustrated schematically in FIGURES 2, 3 and 4, the electromagnet 102 is energized through a pair of conductors 104 and 106, connected respectively to a pair of conductors 108 and 110, which communicate the circuitry to a source S of electrical potential, for example, 110 volts alternating current. A manually controlled switch 112 is positioned in the conductor 110 and serves to control the energization of the electromagnet 102 as well as the other electrically energized components of the control system. A diode 114 is connected to the conductor 104 and serves to change the alternating current to direct current for energization of the electromagnet 102. When the electromagnet 102 is energized with the toggle arm 86 in the position illustrated in FIGURE 2, an armature 116, fixed to the free end of the toggle arm 86, is retained in engagement with the electromagnet 102 to maintain the toggle linkage in its operative or reset position.

Also illustrated schematically in FIGURES 2, 3, 4 and 5, control circuitry for selective energization of the motor 76 is provided. A pair of motor control conductors 118 and 120 are connected respectively to the power source conductors 108 and 110 and are connected to the motor 76 to communicate the motor circuit with the source of power S for energization of the motor. The motor 76 is selectively energized through the master switch 112 in the conductor 110 and through a switch 122 in the conductor 118. The switch 122 is spring biased to its closed position and has an operating projection 124 thereon positioned in the path of movement of the lower cam track 74. The cam track 74 at the lowermost portion of its oscillation will engage the switch projection 124 and move the switch 122 against its bias to the open position, thereby deenergizing the motor 76. A second spring biased switch 126, which is employed as a safety switch, is connected through conductors 128 and 130 and through the circuit of the motor 76 to the power source conductors 108 and 110 to provide an alternate control for the motor 76. The conductor 128 is connected through a portion of the conductor 118 through the circuit of the motor 76 and through the conductor 120 to the source conductor 110, thereby providing a bypass for the primary motor circuit. A switch actuating projection 132 on the spring biased switch 126 is positioned in the path of movement of the toggle arm 86 and is adapted to be engaged by the toggle arm 86 in the operative or energized position of the toggle arm to move the switch 126 to its open position, thereby breaking the alternate motor circuit. As illustrated in FIGURES 2 and 4, the switch 126 is maintained in its open position when the toggle arm 86 is retained in its operative position by the electromagnet 102. The master switch 112 in the conductor 108 also controls energization of the alternate motor control circuit.

*Operation.*—The control valve actuating apparatus, as illustrated in FIGURE 2, is positioned in such a manner that the control valve in its open position allows the flow of pressurized fluid to the upper portion of the piston operator cylinder 50 through the fluid conduit 54, thereby causing the piston and the valve member to be moved to or maintained at the position illustrated in FIGURE 1. The expanding gate 24 of valve 10 will be in its open position, as illustrated in FIGURE 1, when the piston 48 of the operator 42 is in its lowermost position. The master switch 112 in the conductor 110 will be closed, thereby causing energization of the electromagnet 102 to retain the toggle arm 86 in the position illustrated in FIGURE 2. The spring biased switch 126 will be maintained in its open position by the toggle arm 86, thereby deenergizing the alternate motor circuit. The cam roller 84 will be at or adjacent its lowermost position, thereby causing the extended portion of the lower cam track 74 to engage the switch projection 124, thereby maintaining the switch 122 in its open position, causing the primary motor circuit to be deenergized. It is readily apparent, therefore, that in the open position of the valve 10, as illustrated in FIGURE 2, the electromagnet 112 is the only electrical component which is energized. The current requirement for maintaining the control system in the operative or FIGURE 2 position is quite low and thereby allows the control system to be positioned at locations which are quite remote from the source of electrical energy. Assuming that it is desired to move the pipeline valve 10 to its closed position, the operator will manually move the master switch 112 to its open position as illustrated in FIGURE 3, thereby causing the electromagnet circuit, the primary circuit to the motor and the secondary circuit to the motor to be simultaneously deenergized, and thereby allowing the toggle arm 86 to be released from its FIGURE 2 position. The toggle arm 86 will be pivoted by the control valve spring 69 outwardly from the electromagnet 102 to the position illustrated in FIGURE 3. The toggle linkage, including the connecting links 90 and 94, will be moved from their FIGURE 2 position to the position illustrated in FIGURE 3. Outward movement of the toggle arm 86 will allow the spring biased switch 126 to move to its closed position, closing the alternate motor circuit. The motor 76, however will not be energized at this time because the master switch 112 will be in its open position. During movement of the toggle arm 86 to the position illustrated in FIGURE 3, the stem actuating arm 70 will be caused to pivot about the roller 82 and will cause the valve stem 68 to be raised by the spring 69. This will cause the control valve 62 to be moved to its closed position. Closing of the control valve 62 causes the piston operator 42 to be deenergized, thereby allowing the operator spring 58 to force the piston operator shaft 46 and the gate 24 to the closed position. It is readily apparent, therefore, that the control mechanism of this invention will allow immediate movement of the valve 24 to its closed position upon manual movement of the switch 112 to the open position. Obviously upon failure of the source of electrical power, the control structure of this invention will function as if the switch 112 were opened, thereby providing a fail-safe feature for the pipeline valve system.

Assuming now that the control valve actuator structure is in the position illustrated in FIGURE 3, and that it is desired to cause opening of the valve 24, the operator will move the switch 112 to its closed position causing the control circuitry to be energized. The electromagnet 102, since it is directly connected across the conductors 108 and 110, is immediately energized. The armature 116 on the toggle arm 86, however, is positioned at an excessive distance from the electromagnet in its FIGURE 3 position and will not be moved by the electromagnet. Since the toggle arm 86 is pivoted outwardly, the spring biased switch 126 will be in its closed position causing energization of the motor 76 through the alternate motor control conductors 128 and 130. The motor 76 will drive the roller 82 to its topmost position, causing the stem actuating arm 70 to pivot about the stem pivot 71 thereby causing the toggle linkage to move to the position illustrated in FIGURE 4. The control valve stem 68 at the uppermost limit of its longitudinal movement will serve as a pivot causing the pivot 88 on the stem actuating arm 70 to be moved downwardly, as illustrated in FIGURE 4. This will cause movement of the toggle linkage to the FIGURE 4 position. As the armature 116 of the toggle arm 86 is moved to a position adjacent the electromagnet 102, the armature will be drawn into engagement with the electromagnet thereby causing the toggle linkage to be maintained in the position illustrated in FIGURES 2 and 4. In this position the actuating stem 132 of the spring biased switch 126 will move the switch 126 to its open position causing deenergization of the alternate motor actuating circuit. During movement of the stem actuating arm from the FIGURE 3 position to the FIGURE 4 position by the rotating roller 82, the extension portion of the lower cam track 74 will move out of engagement with the switch actuating projection 124, allowing the spring biased switch 122 to move to its closed position causing energization of the primary motor operating circuit. The switch 122 is allowed to close prior to opening of the switch 126, thereby allowing the motor to remain energized for continued motor operation during movement of the stem actuating arm and toggle linkage to the position illustrated in FIGURE 4. The motor 76 will continue to operate through the closed switch 122 after resetting of the toggle linkage by the electromagnet 102, thereby causing the roller 82 to continue in its rotation to the lowermost position as illustrated in FIGURE 3. FIGURE 5 is illustrative of the relative positioning of the linkage components of the control system during rotation of the roller 82 between the FIGURE 4 and FIGURE 2 positions. After the toggle linkage has been reset by bringing the armature 116 into intimate contact with the electromagnet 102 as illustrated in FIGURE 4, the toggle linkage will remain in its reset condition and the motor will continue operation through its primary electrical circuit. The alternate electrical circuit is deenergized simultaneously with resetting of the toggle linkage because the toggle arm 86 in the FIGURE 4 or reset position engages the projection 132 of the switch 126 and causes the switch to open. As illustrated in FIGURE 5, the toggle linkage remains in the reset position and the roller 82 is being rotated clockwise thereby forcing the arm 70 and the valve stem 68 downwardly against the bias of the valve spring 69. The roller 82 (FIGURE 5) has moved through approximately 90° of its rotation from the FIGURE 4 position. At approximately 175° of rotation the extended portion of the cam track 74 will engage the projection 124 and move the switch 122 to its open position, as illustrated in FIGURE 2, thereby opening the primary motor circuit. The motor 76 will be deenergized and will cease to operate and the linkages will remain in the FIGURE 2 position as long as the electromagnet 102 remains energized. The stem 68 of the control valve 62 will remain depressed to its operative or open position against the bias of the valve spring 69 as long as the linkages remain in the positions as illustrated in FIGURE 2.

As was discussed in detail hereinabove, deenergization of the electromagnet circuit will cause an instantaneous movement of the toggle linkage and the control valve 62 to a safe position. Deenergization of the circuitry may be caused by an operator to move the pipeline valve 10 to a desired position or it may occur by failure of the source of electrical power or by damage to the electrical circuitry. In either case, the pipeline valve 10 will be moved to a predetermined safe position.

By employing the novel control valve actuating mechanism of this invention, the gate member 24 of the valve 10 may be moved to its closed position at any time during actuation or resetting of the control valve actuating mechanism merely by opening the switch 112. Upon deenergization of the electromagnet 102 by opening the switch 112, the toggle arm 86 will suddenly move outwardly resulting in upward movement of the control valve stem 68 to its closed position to allow closing of the pipeline valve 10 by the fail-safe fluid motor 42.

It will be evident from the foregoing that I have provided a novel control valve actuating mechanism for the fluid motor of a submergible or remotely located power operated valve which effectively attains all of the objects hereinabove set forth. The invention effectively eliminates the disadvantages involved in the use of solenoid actuated control mechanisms by providing a construction which is operable at extreme distances from the electrical power source because of the low electrical power requirement inherent in the invention. The invention is so constructed that it will cause the control valve of the hydraulic system to close or to move to a predetermined safe position immediately should there be a loss of power in the electrical circuitry of the invention or if it should be desired to suddenly close the pipeline valve for safety reasons. The invention in effect is not only a novel control valve actuating mechanism but also is a fail-safe structure which induces automatic movement of the pipeline valve to a safe position in case of electrical power failure within the control valve actuating mechanism. The invention is extremely simple in construction thereby insuring its reliability in operation. It is evident, therefore, that this invention is one well adapted to attain all of the objects hereinabove set forth together with other advantages which are obvious and inherent from the description of the apparatus itself.

It will be understood that certain features and subcombinations are of utility and may be employed without reference to other features and subcombinations.

This is contemplated by and is within the scope of the claims. As many possible embodiments may be made of the invention without departing from the spirit or scope thereof, it is to be understood that all matters herein set forth or as shown in the accompanying drawings are to be interpreted as illustrative and not in a limiting sense.

I claim:

1. A control mechanism for controlling energization and deenergization of a remotely located power operated device, said control mechanism including an operating stem, a stem actuating arm connected to said operating stem, linkage means for said control mechanism having a pivot, said stem actuating arm one end thereof being pivotally connected to said pivot, drive means engaging said stem actuating arm at the other extremity thereof and being selectively operative to impart oscillation to said stem actuating arm about said pivot and thereby to impart movement to said operating stem, said linkage means being movable between first and second positions to cause movement of said pivot and through said pivotal connection with said stem actuating arm to impart rotational movement to said stem actuating arm about said drive means and to thereby impart movement to said operating stem, a small rotary electric motor adapted to control movement of said drive means, an electrical circuit connecting said motor with a source of electrical potential, said circuit including a first switch for controlling energization of the circuit, a second switch in said circuit being normally biased to its closed position and adapted to be contacted and moved to its open position by said actuating arm in one position thereof to deenergize said motor circuit thereby stopping said stem actuating arm at said one position, said linkage means being movable responsive either to opening of said first switch or failure of said electrical potential to effect movement of said pivot and said stem actuating arm to said one position.

2. A control mechanism as recited in claim 1, said linkage means comprising a toggle linkage including said pivot for said actuating arm, said toggle linkage being movable between a reset position where said pivot is stationary and an unreset position where said pivot is movable, means for releasably retaining said toggle linkage in said reset position.

3. A control mechanism as recited in claim 2, said means for releasably retaining said toggle in said first position being an electromagnet having an electrical circuit which is controlled by said first switch.

4. A control mechanism as set forth in claim 1, a third switch in said circuitry and being engageable by said linkage means to deenergize said motor, said circuitry allowing energization of said motor through either or both of said second and third switches.

5. A control mechanism as recited in claim 1, said stem actuating arm defining a cam track, a drive arm being rotated by said motor and having means engaging said cam track whereby the rotary motion of said stem actuating arm transmits oscillatory motion to the stem actuating arm and longitudinal reciprocation to the stem.

6. Actuating means as recited in claim 5, said stem actuating arm being bifurcated at one end thereof to define said cam track, said means engaging the cam track being a roller movably mounted on the drive arm and disposed in said cam track.

7. Actuating means for the control structure of a power operator, said actuating means comprising an actuating stem, a stem actuating arm connected to said stem and adapted to induce reciprocating movement to the stem, drive means engaging the stem actuating arm adjacent one end thereof and adapted to oscillate the stem actuating arm to cause reciprocation of said stem, a motor for controlling movement of said drive means, circuitry connecting said motor with a source of power, said circuitry including a first circuitry energization control device for controlling selective energization of said circuitry, a second circuitry energization control device in said circuitry engageable by said stem actuating arm to cause deenergization of said motor and thereby causing the stem actuating arm and stem to stop and remain at a preselected position, safety means connected to said stem actuating arm and being responsive to deenergization of said circuitry either by the first control device or by failure of said power source for moving the stem actuating arm to a position where the stem is in a preselected safe position and the second control device is in a position causing deenergizing of said motor circuitry.

8. Actuating means as set forth in claim 7, a third circuitry energization control device in said circuitry and being engageable by said safety means to deenergize said motor, whereby said motor will operate upon being energized by said source of power through either or both of said second and third circuitry energization control devices.

9. Actuating means as recited in claim 7, said stem actuating arm defining a cam track, a drive arm being rotated by said motor, said drive arm having means engaging said cam track whereby the rotary motion of said drive arm transmits oscillation motion to said stem actuating arm and reciprocation to said stem.

10. A control mechanism for controlling energization and deenergization of a remotely located power operated device, said control mechanism including an operating stem, a stem actuating arm connected intermediate its ends, to said operating stem, a toggle linkage for said control mechanism having a pivot, said stem actuating arm at one end thereof being pivotally connected to said pivot, rotary drive means engaging said stem actuating arm at the other extremity thereof and being operative to impart oscillation to said stem actuating arm about said pivot and thereby to impart movement to said operating stem, said toggle linkage means being movable between first and second positions to cause movement of said pivot and through said pivotal connection with said stem actuating arm to impart oscillational movement of said stem actuating arm about said drive means as a pivot and to thereby impart movement to said operating stem, means for selectively retaining said toggle linkage in said first position and selectively moving said toggle linkage to said second position to impart desired movement to said pivot.

11. A control mechanism for controlling energization and deenergization of a remotely located power operated device, said control mechanism including an operating stem, a stem actuating arm connected to said operating stem, a toggle linkage for said control mechanism having a pivot, said stem actuating arm at one end thereof being pivotally connected intermediate its ends to said pivot, rotary drive means engaging said stem actuating arm at the other extremity thereof and being operative to impart oscillation to said stem actuating arm about said pivot and thereby to impart movement to said operating stem, said toggle linkage means being movable between first and second positions to cause movement of said pivot and through said pivotal connection with said stem actuating arm to impart oscillational movement of said stem actuating arm about said drive means as a pivot and to thereby impart movement to said operating stem, whereby said operating stem may be selectively moved by either said toggle linkage or said rotary drive means, electrically energized means for retaining said toggle linkage in said first position and selectively moving said toggle linkage to said second position to impart desired movement to said pivot.

References Cited

UNITED STATES PATENTS

| | | | |
|---|---|---|---|
| 695,724 | 3/1902 | Herman | 74—520 |
| 2,318,814 | 5/1943 | Strong | 74—520 |

ORIS L. RADER, *Primary Examiner.*

B. A. COOPER, *Assistant Examiner.*